(12) United States Patent
Feist et al.

(10) Patent No.: US 10,860,490 B2
(45) Date of Patent: *Dec. 8, 2020

(54) DISTRIBUTED MEDIA CACHE

(71) Applicant: Seagate Technology LLC, Cupertino, CA (US)

(72) Inventors: Jason M. Feist, Shakopee, MN (US); Mark Allen Gaertner, Vadnais Heights, MN (US); Dipeshkumar J. Purani, Shakopee, MN (US); Anil Kashyap, Eden Prairie, MN (US); Wei Zhao, Shakopee, MN (US)

(73) Assignee: Seagate Technology LLC, Fremont, CA (US)

(*) Notice: Subject to any disclaimer, the term of this patent is extended or adjusted under 35 U.S.C. 154(b) by 3 days.

This patent is subject to a terminal disclaimer.

(21) Appl. No.: 16/272,249

(22) Filed: Feb. 11, 2019

(65) Prior Publication Data
US 2019/0171571 A1 Jun. 6, 2019

Related U.S. Application Data

(63) Continuation of application No. 15/008,736, filed on Jan. 28, 2016, now Pat. No. 10,223,275.

(51) Int. Cl.
*G06F 12/0871* (2016.01)
*G06F 12/0873* (2016.01)

(52) U.S. Cl.
CPC ...... *G06F 12/0871* (2013.01); *G06F 12/0873* (2013.01); *G06F 2212/1036* (2013.01)

(58) Field of Classification Search
CPC ......... G06F 12/0871; G06F 2212/1036; G06F 12/0873
USPC .......................................................... 711/113
See application file for complete search history.

(56) References Cited

U.S. PATENT DOCUMENTS

| | | |
|---|---|---|
| 6,915,373 B2 | 7/2005 | Bennett |
| 8,275,967 B2 * | 9/2012 | Harris ................ G06F 3/0613 711/171 |
| 8,947,817 B1 | 2/2015 | Chung et al. |
| 2002/0174302 A1 | 11/2002 | Frank |
| 2006/0253650 A1 | 11/2006 | Forrer, Jr. et al. |
| 2010/0134914 A1 | 6/2010 | Koester |
| 2011/0161557 A1 | 6/2011 | Haines et al. |
| 2012/0300328 A1 | 11/2012 | Coker et al. |
| 2015/0117173 A1 | 4/2015 | Green et al. |
| 2015/0179214 A1 | 6/2015 | Pantel |

* cited by examiner

Primary Examiner — David Yi
Assistant Examiner — Zubair Ahmed
(74) Attorney, Agent, or Firm — Mueting Raasch Group

(57) ABSTRACT

Zones of a magnetic recording medium are allocated as a respective plurality of distributed media caches arranged in a predetermined order. For each of a plurality of caching events, cache data is written to one or more of the distributed media caches. A next of the media caches in the predetermined order is selected for the next caching event.

20 Claims, 4 Drawing Sheets

DISTRIBUTED MEDIA CACHE

RELATED PATENT DOCUMENTS

This application is a continuation of U.S. application Ser. No. 15/008,736, filed Jan. 28, 2016, which is incorporated herein by reference in its entirety.

SUMMARY

The present disclosure is directed to a method, system, and apparatus configured for managing wear of a distributed media cache. In one embodiment, zones of a magnetic recording medium are allocated as a respective plurality of distributed media caches arranged in a predetermined order. For each of a plurality of caching events, cache data is written to a selected one or more of the distributed media caches, and a next of the distributed media caches in the predetermined order is selected for the next caching event if the selected caches are not a last in the predetermined order. Otherwise a first media cache is selected in the predetermined order if the selected distributed media cache is the last of the predetermined order.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
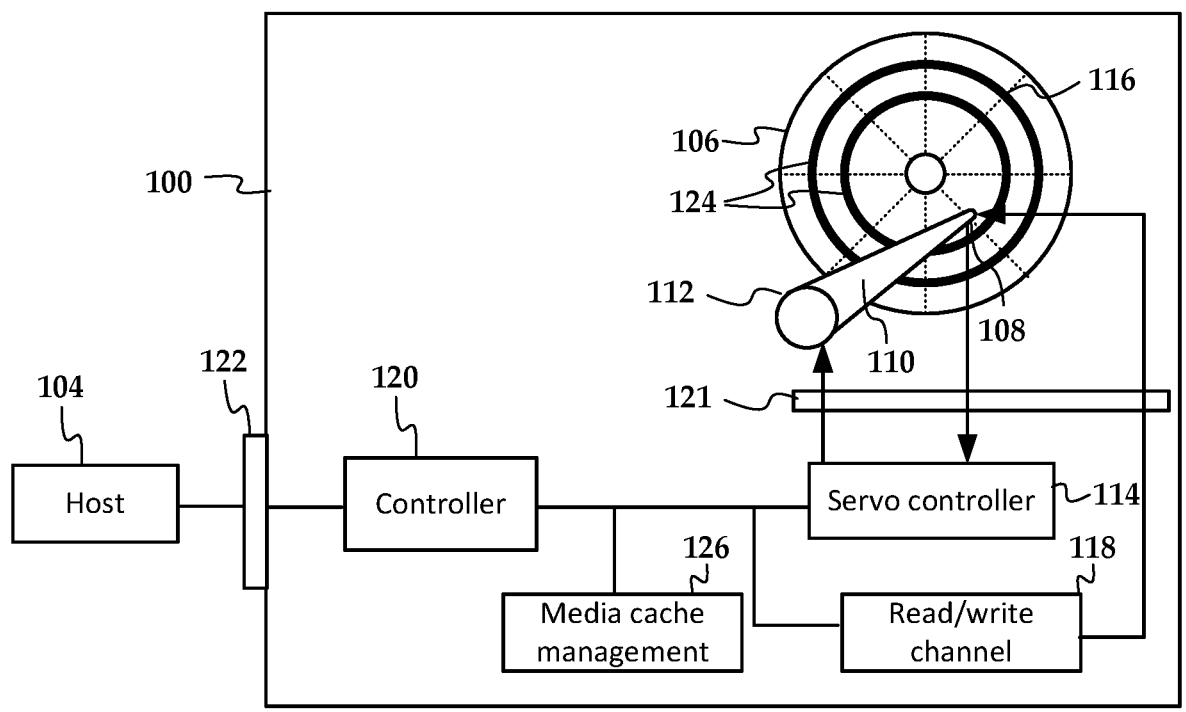
FIG. 1 is a block diagram of a hard disk drive apparatus according to an example embodiment.

The present disclosure generally relates to magnetic hard disk drives. In order to increase performance and/or reliability, disk drives may implement various types of read and write caching. Generally, caching involves storing data in a relatively fast storage to service immediate read or write needs, and moving the cached data to slower storage when it is no longer immediately needed. Some hard disk caching arrangements use hierarchies of memory that go from fastest, e.g., dynamic random access memory (DRAM), to slowest, e.g., magnetic storage. The storage capacity of each hierarchy is usually inverse to its speed, e.g., the fastest level of cache has lowest storage capacity and slowest level of cache can store the most data. For purposes of the following description, the caching schemes are used internally by the hard disk, and do not extend to system-wide caching, e.g., system central processing unit (CPU) caches, system DRAM, etc.

Hard disk drives described herein utilize what is referred to as a "media cache." A media cache may be configured as a reserved space on a data storage medium (e.g., magnetic disk) that is not statically mapped to user logical block addresses (LBAs). The media cache can have a relatively large capacity, as compared to a DRAM or flash media cache layers. The media cache may be located in a region that provides fast access, and data written to the media cache may be configured as large sequential writes to improve throughput.

The media cache may be used when a large amount of data associated with one or more write operations have to be stored quickly, such as when audio or video data is streamed from a host. In other scenarios, data intended for non-sequential addresses to be stored sequentially to the media cache. This can avoid multiple non-sequential accesses to the main store when completing a series of write commands. The non-sequential accesses would require the read/write heads to move to different tracks (seeks), which are relatively time consuming. Thus, the amount of time needed to complete the series of write commands can be significantly reduced by first storing the data in the media cache and then later moving the data to the target sectors later, e.g., during times when the drive is not being heavily utilized.

It will be understood that the media caches described herein can be used for read-caching as well, e.g., copying data already stored in user data sectors to a contiguous media cache region such that host read requests are serviced from the media cache instead of the user data sectors. In such a case, cache data will still be written to the media cache, in this case data originating internally within the device. Therefore, descriptions herein of writing data to a media cache are not intended to be limited to write-caching scenarios only, and may apply equally to read-caching.

Under some conditions, the media cache may be written to significantly more often than the portions of the media reserved for user data (e.g., data sectors mapped to user-accessible LBAs). This level of writing to the media cache can result in narrow band wear-out that leads to high failure rates in the later years of service life. In some implementations, media cache(s) may be distributed in multiple physical locations. However an uncontrolled access pattern to these media cache locations may result in excess wear that may compromise product reliability. As will be described below, a hard disk drive device can implement a distributed caching scheme that reduces the amount of wear affecting a media cache.

In order to better understand the types of devices in which a media cache controller may operate, the block diagram in FIG. 1 shows a disk drive apparatus according to an example embodiment. The hard drive 100 includes one or more magnetic disks 106 used as a recording medium. One or more read/write heads 108 are mounted to one or more arms 110 that are driven together radially via a voice coil motor 112 and optionally via a microactuator (not shown) that can drive each read/write head 108 independently. There may be one read/write head 108 dedicated to each surface of the disks 106. A servo controller 114 reads servo marks 116 on the disk 106 via the read/write heads 108. The servo marks 116 facilitate locating where (e.g., which track and sector) the read/write heads 108 are located.

A read/write channel 118 at least encodes and decodes data written to the disks 116, and may provide other functions, e.g., error correction, timing adjustment, analog-to-digital conversion, digital-to-analog conversion, etc. Interface circuitry 121 facilitates communications between the read/write channel 118 and the read/write heads 108. Such circuitry 121 may include, but is not limited to preamplifiers, amplifiers, filters, etc.

A controller 120 provides system-level control of operations of the hard drive device 100, including servo control and processing data streams via the read/write channel 118. The controller 120 may facilitate operations of other components not shown, such as sub-processors, read/write channels 118, disk motor control, power distribution, etc. The hard drive apparatus 100 includes a host interface 122 for communicating with external devices, as represented by host 104. The host 104 makes request for data storage and retrieval via the host interface 122, the requests being processed via the controller 120.

The disks 106 are configured with a plurality of media cache regions 124 located on various locations of the disks 106. The media cache regions 124 are reserved for use by a media cache management module 126, which may be part of system firmware run by the controller 120. The media cache regions 124 may not be directly accessible by the host 104 (e.g., via an LBA) although data written and/or read in response to host requests may be stored in the media cache regions 124 at least temporarily. The media cache management module 126 performs, among other things, selecting a region 124 for use as a current media cache, selecting data to be stored on the media cache, flushing the media cache (e.g., movement of data from the media cache to user data regions), ensuring coherence between the media cache data and associated user data sectors (e.g., ensuring read requests return the most recent data from either the cache or the user data regions).

The capacity allocated for the media cache regions 124 may be predefined by product and head count, e.g., x % of data sectors may be reserved for media cache, and the regions may be distributed equally or unequally across all disk surfaces. In other cases, the media cache may have a fixed minimum capacity and requirements regarding minimum distribution that will dictate layout. The media cache management module 126 selects a one or more media cache regions 124 to use as a media cache, and changes the regions 124 periodically to prevent head and/or disk wear. This wear may be due to, e.g., periodic head/disk contact, thermal degradation, etc.

For various types of recording media, wear models have been developed that define a specific a time allowable on a given track, location, region, etc., based on observed field failures. These failures are due to, among other things, contaminants and low head-to-media clearances, and may vary based on air-bearing surface designs of the read/write heads. Based on and a stress condition derived from the model and expected field write workloads (e.g., 98 percentile), an optimal placement of the media caching regions 124 can be determined. The media cache capacity may be over-provisioned to prevent undue wear in the media cache regions as the result of a field re-manufacturing operation.

A re-manufacturing operation occurs when there is a failure of a read/write head. This may occur during certification testing in the factory, or in the field with a drive that has already been in use. The failed read/write head is removed from use, which may be referred to as being electrically depopulated. The firmware adapts the system to use only the remaining read/write heads, and the total capacity of the drive is reduced by the amount of unusable storage of the disc surface associated with the depopulated head. As noted above, the reduction of the available storage will also reduce the available space for the media cache regions 124, and so overprovisioning (providing more data storage space than needed) can help reduce the wear of the remaining media cache portions in the remanufactured drive. Additionally, overprovisioning allows the media cache to continue with a guaranteed minimum capacity.

In embodiments described below, the data is written to the media cache regions 124 in a cyclical fashion. For example, a first subset of the regions 124 (or portions thereof) may be used as a current media cache, after which a second subset of the regions 124 (or portions thereof) are used. This selection of the next region 124 continues to the last of the regions 124 are used, after which the first of the regions is used again. In some embodiments, the next region may be selected based on the existing region being fully utilized, and the next region selected based on an ordering of the regions. In other embodiments, the selection of the regions may be based on a fixed or variable time period during which the current region is used, and be based on write time, amount of data written, elapsed system time, etc. Either of these embodiments can ensure there is no repeated access to a small location of media for the given amount of time.

Figure 2:
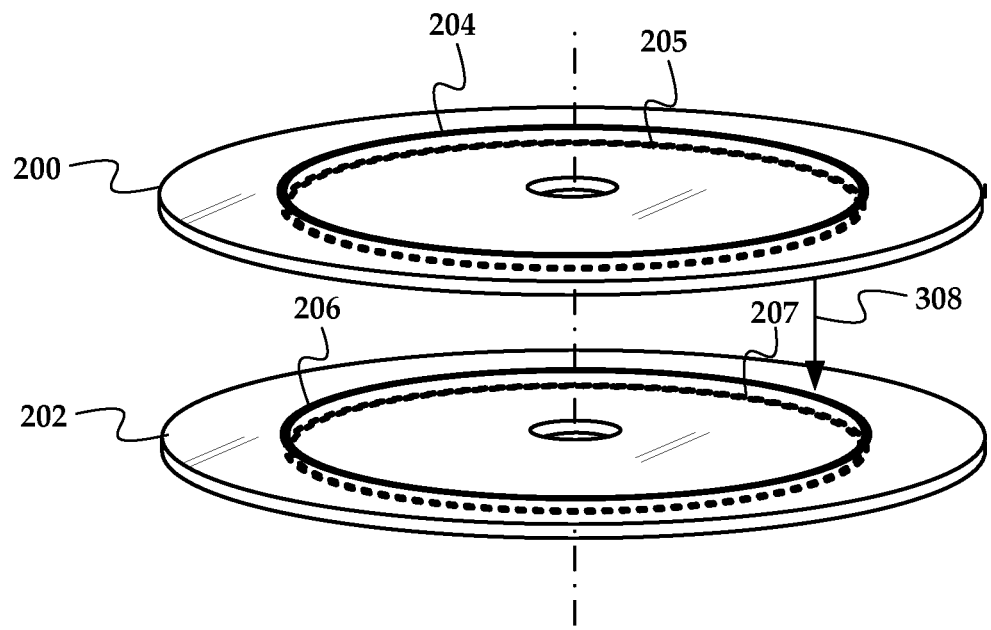
FIG. 2 is a diagram illustrating an arrangement of hard drive serpents according to an example embodiment.

Media cache regions 124 may be defined by mini-serpents. A "serpent" refers to a sequence of adjacent tracks on the media where each sequence is approximately vertically aligned, an example of which is illustrated in FIG. 2. In FIG. 2, an exploded view shows two magnetic disks 200, 202 that are part of a disk drive device. Each surface of the disks 200, 302 may read by separate read/write heads (not shown). For sequentially written data that reaches a certain size, the data may be split into different serpents 204-207 on different sides of the disks 200, 202. The size of the serpents 204-207 may be predefined by the system design.

Generally, a set of tracks smaller than the system-defined serpent size (mini-serpent) may be used as media cache. The mini-serpent-sized cache regions minimize consumption of user space while allowing for a minimum number of regions for each zone/head. In one embodiment a mini-serpent comprises 12 tracks. In other embodiments, just a subset of tracks within a serpent or mini-serpent may be used. Further, the media cache regions (mini-serpents) are physically distributed to reduce media wear. In one embodiment, the media cache regions are separated from adjacent data regions (guard bands) by a distance equal to or greater than the width of the head slider.

The media cache regions can be placed in physical areas that are the most tolerant to a high level of write activity. In one embodiment, these areas are located between the middle diameter and outer diameter of the discs. The firmware can be configured to dynamically adjust the guard-banding of the caching region on a drive-by-drive, zone-by-zone, and head-by-head basis based on the areal density chosen in the factory for device. This ensures that the media cache capacity is met on all drives and the media cache is evenly used for all drives. For example, if some physical addresses are not usable, e.g., due to media defects, the guard bands can be adjusted to redistribute the lost capacity to other media cache regions. Another way to accomplish even wear is to change the number of sectors/track within the media cache by altering the linear bit density used within the media cache. The media cache regions may initially use a low bit density, resulting in a relatively low number of sectors per region. In response to a loss of capacity as described above, the bit density can be increased for all the regions to compensate, thereby increasing the number of sectors throughout.

Figure 3A:
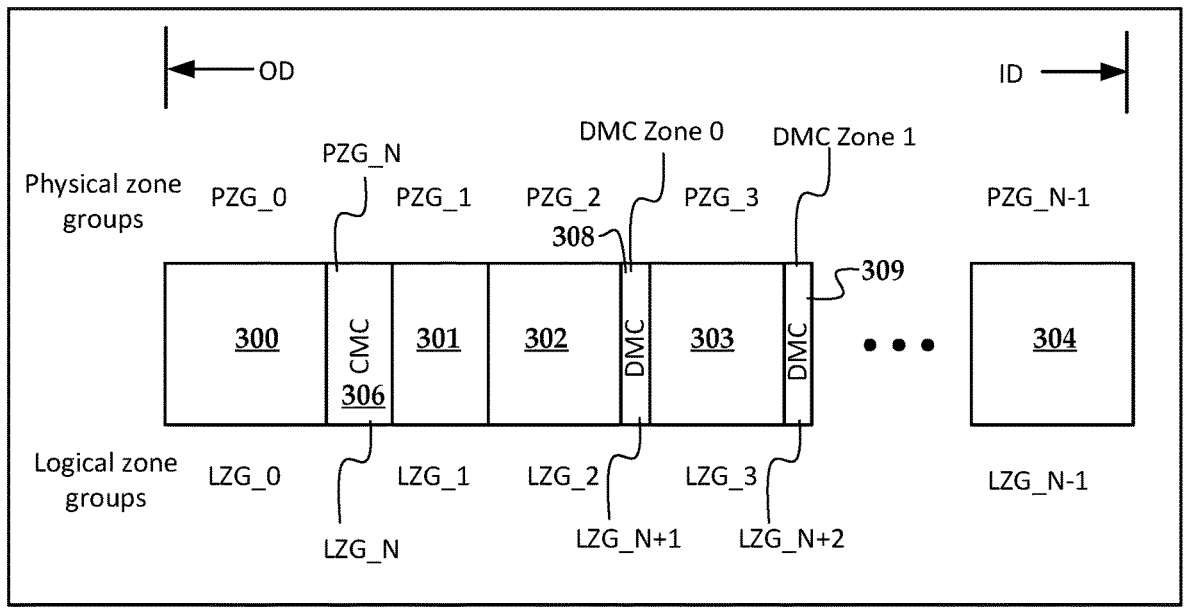
FIGS. 3A-B are block diagrams of media cache configurations according to an example embodiment.

In FIG. 3A, a block diagram illustrates physical and logical layout for a distributed media cache regions/zones according to an example embodiment. Generally, the illustrated regions are logical/physical address regions arranged from an outer diameter (OD) to an inner diameter (ID).

Regions 300-304 are user data regions associated with physical zone groups PGZ_0 to PGZ_N−1 and logical zone groups LGZ_0 to LGZ_N−1. Region 306 represents a centralized media cache (CMC) that is assigned respective physical and logical zone groups PZG_N and LGZ_N. The CMC is a non-distributed cache region within a contiguous address space. Regions 308 and 309 represent portions of a distributed media cache (DMC) that are assigned logical zones LZG_N+1 and LZG_N+2. The DMC zones may be located between a middle diameter (not shown) and the OD.

The logical zone groups LGZ_0 to LGZ_N−1 are user addressable, e.g., read from and written to via the host interface using an LBA for reference. The logical zones LZG_N and above are reserved for use by the media cache controller. Note that the logical zones are interleaved in the physical address space. For example, DMC zone 308 has logical addresses greater than that of LGZ_N−1, but it physical location is between PZG_2 and PZG_3, which have logical addresses less than LGZ_N−1. For purposes of this example, it is assumed only two DMC zones are used, although in practice a larger number of DMC zones may be used, e.g., several to hundreds.

Figure 3B:
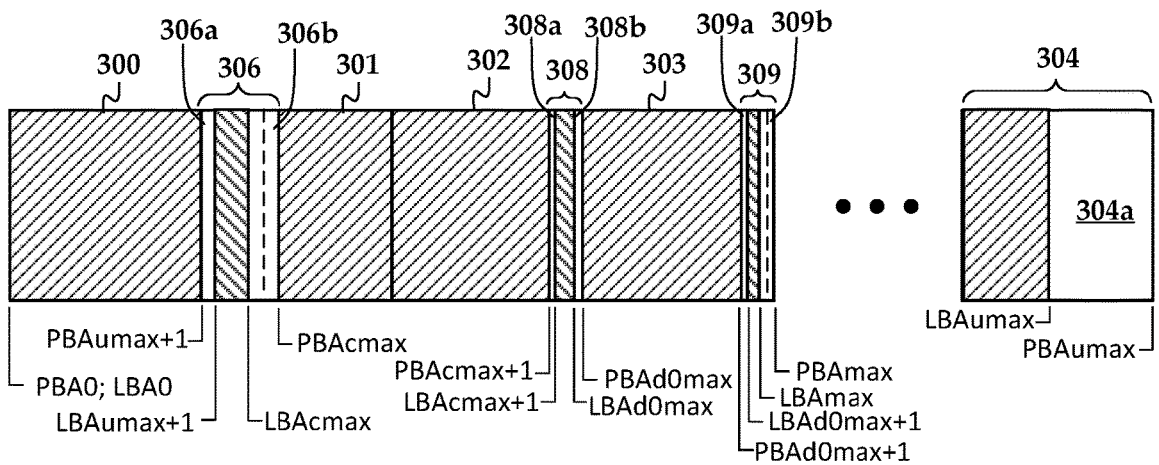

In FIG. 3B, a block diagram shows additional details about the CMC and DMC regions from FIG. 3A. On both sides of CMC 306 and DMC 308, 309, guard tracks 306a-b, 308a-b, and 309a-b are shown. Regions 306b and 309b have a plurality of tracks in their respective zones, and these are spare regions for the CMC and DMC, respectively. In some embodiments, all the DMC may have spare regions, e.g., 308b could also include a plurality of tracks. These spare regions are used as overprovisioning for the media caches. Region 304a is a spare region for user data, e.g., overprovisioned user space. One of the purposes of spare regions 304a is to deal with media defects. Physical addresses that are not usable because of media defects are removed from use (e.g., mapped out) thus reducing the capacity. To guarantee a minimum capacity, spares exist so that they can be used within the logical address space of the media caches to guarantee capacity. The spare regions 304a may be implemented in a number of ways described in detail below, such as initial overprovision of the regions, changing of guard bands used by the regions, and changing of areal density in the regions.

At the bottom of the diagram in FIG. 3B, annotations show various LBAs and physical block addresses (PBAs). Generally, an LBA is used at an application level. For example, host requests will reference user LBAs and internal media cache management will use CMC/DMC LBAs. The physical addresses generally correspond to data sectors on the recording medium. Table 1 below provides a description of the LBAs and PBAs shown in FIG. 3B.

TABLE 1

| Address | Description |
| --- | --- |
| PBA0 | First PBA of user area |
| PBAumax | Last PBA of user area |
| PBAumax + 1 | First PBA of CMC zone |
| PBAcmax | Last PBA of CMC zone |
| PBAcmax + 1 | First PBA of DMC zone 0 |
| PBAd0max | Last PBA of DMC zone 0 |
| PBAd0max + 1 | First PBA of DMC zone 1 |
| PBAmax | Last PBA of DMC zone 1 |
| LBA0 | First LBA of user area |
| LBAumax | Last LBA of user area |
| LBAumax + 1 | First LBA of CMC zone |
| LBAcmax | Last LBA of CMC zone |
| LBAcmax + 1 | First LBA of DMC zone 0 |

TABLE 1-continued

| Address | Description |
| --- | --- |
| LBAd0max | Last LBA of DMC zone 0 |
| LBAd0max + 1 | First LBA of DMC zone 1 |
| LBAd1max | Last LBA of DMC zone 1 |

The spare regions 306b and 309b facilitate dynamic guard-banding, e.g., the changing of media cache capacity by changing the size of guard bands. For example, the spare regions 306b and 309b can used for allocating additional space for the media cache if heads are electrically depopulated in the field. This ensures that the media cache regions continue to wear level across all heads and zones.

Cache zone locations indicated in FIGS. 3A-B can be identified in a system file so the factory processes and/or firmware know where to layout the zones in such a format. The cache zone locations are determined by using a model that provides the maximum time the head can stay in a band (set of tracks) for a given interval. Using the model values and a specified field write workload (e.g., 98 percentile), the number of sections across which the media cache has to be spread out can be determined.

In one embodiment, the system firmware executes a form of write caching (e.g., DRAM mirroring) with commands being written to the media cache as a backup copy of the contents of DRAM. This copy provides a non-volatile backup of data (e.g., cached data, buffered commands, system state, etc.) in the case of power loss. The DRAM mirroring does not need to be associated with fixed physical locations inside the media cache. A caching algorithm starts at the beginning of the media cache and fills all media cache locations with data and then starts back over at the beginning.

Figure 4:
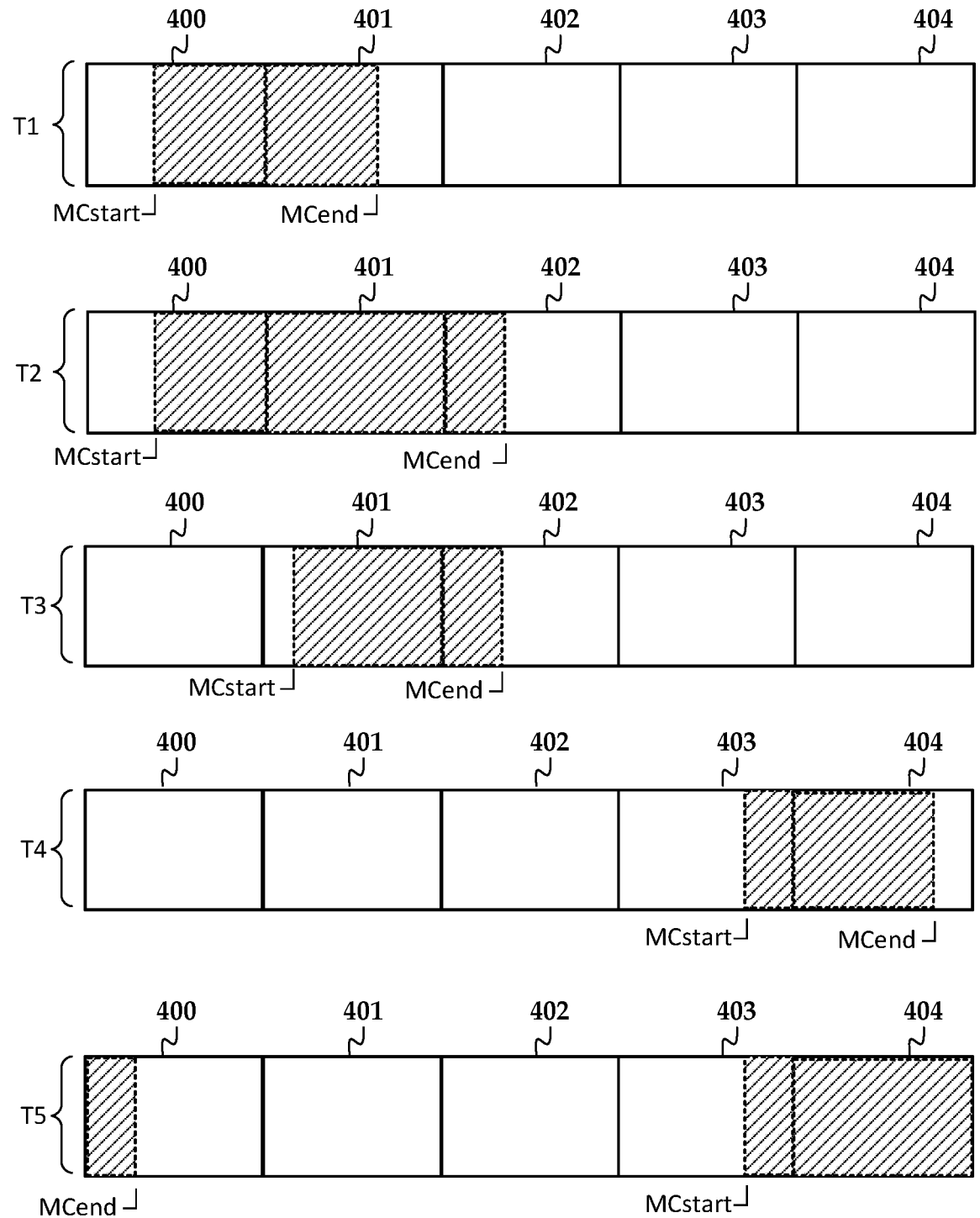
FIG. 4 is a block diagram illustrating a caching algorithm according to an example embodiment

An example of a caching algorithm according to an example embodiment shown in the block diagram of FIG. 4. In this example, five media cache zones 400-404 are shown at five different instants of time, T1-T5. At time T1, the shaded area indicates cached data, which is written starting at an LBA labeled MCstart and ending at an LBA labeled MCend. Generally, MCstart and MCend may be pointers to addresses that indicate the start and the end of the cache. Any subsequent additions to the cache will begin at the address pointed to by MCend, after which MCend is changed to point to the LBA at end of the new additions, as indicated at time T2. At time T3, a cleanup has occurred, in which data no longer needed is removed from use by moving the MCstart pointer as indicated. This may be accomplished by reading a time stamp associated with the data, reading a delimiter in the cached data that indicates a boundary, e.g., of a DRAM image.

The addition and cleanup operations result in active regions of the media cache being moved through each of the zones 400-404 in a regular fashion, such as seen at time T4, in which data is written in the last two zones 403-404. At time T5, additional data has been written, resulting in the data being wrapped around to the first zone 400. For any condition where MCend points to an address in a lower zone than MCstart, it may be assumed that the used portion of the media cache has been wrapped around from the end (e.g., last cache region in sequence) back to the beginning (e.g., first cache in sequence). Although the zones 400-404 may be located in order along a disk surface, e.g., from OD to ID or vice versa, the embodiments need not be so limited. For example, the ordering of the zones may be random, interleaved, etc.

Cleaning operations are scheduled to ensure that the media cache is getting cleaned at an equivalent rate to the incoming data rate. The cleaning operations may be scheduled in the background, as it may require reading at least some of the data in the media cache to determine what data is no longer needed. In some embodiments, e.g., where the distributed media cache is used to temporarily store user data, the cleaning operations may also involve copying cached data to the user data zones before moving the starting pointer. In other cases, the cleaning operations may involve moving cached data from an old zone to the newly used zone.

When a head goes through a re-manufacturing operation in the field, the firmware will lose the media zones on that surface that is electrically depopulated. When this happens the firmware may increase storage capacity of other zones. One way of increasing storage capacity if the zones is to adjust the guard-bands for zones accessed by the remaining heads to ensure that the media-cache capacity required for optimal performance is maintained. This may involve, for example, changing a mapping between logical address and physical addresses to include additional physical addresses that were previously skipped in order to provide the spare guard zones. The guard band adjustment can occur on all remaining cache zones to ensure that the write load is spread evenly across the zones. In other cases, the overprovisioned space may reside elsewhere in the zones besides the guard bands, e.g., one or more middle tracks of the zone.

Figure 5:
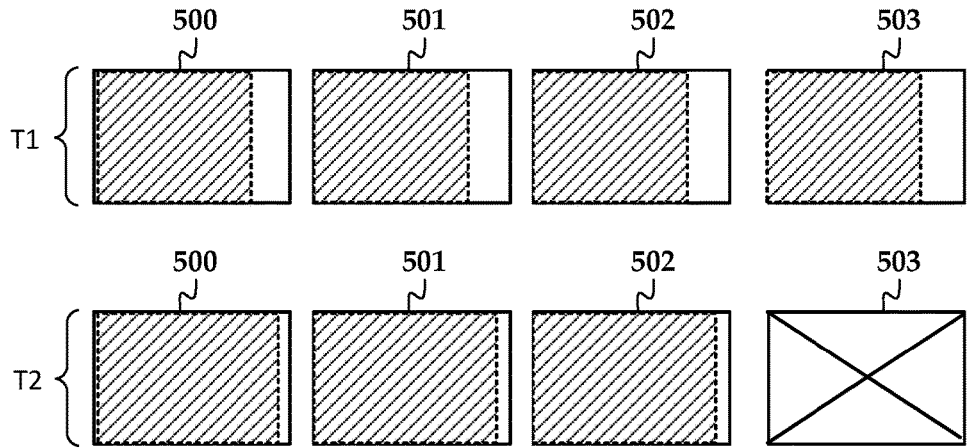
FIG. 5 is a block diagram illustrating reallocation of media cache zones according to an example embodiment.

In FIG. 5, a block diagram illustrates how media cache zone space can be reallocated in a storage device according to an example embodiment. Blocks 500-503 represent media zone allocations for four disk drive surfaces. The shaded parts of the blocks 500-503 represent storage space usable for media caching, and the white parts represent overprovisioned storage, e.g., guard bands for distributed media cache zones. At time T1, all surfaces are available. At time T2, a field re-manufacturing operation has depopulated a read/write head associated with surface represented by block 503. Accordingly, the shaded areas in the other blocks 500-502 have increased to compensate. Other events may also cause the change in capacity shown in FIG. 5. For example, if region represented by block 503 experiences a reduction in capacity (e.g., due to media manufacturing defects or subsequent damage), block 503 may still have some remaining capacity, and the loss of capacity is compensated for by increasing the capacity of zones 500-502 as shown.

The increase of the capacity of blocks 500-502 may be accomplished using any combination of changing the number or size of guard bands, reclaiming other unallocated tracks, and changing areal density within the blocks 500-502. The firmware can set an initial areal density via a factory process. The areal density of the drive is based on the track pitch and linear bit density. Track pitch is the center-to-center distance between adjacent tracks, and is inversely related to track density, which is measured in tracks-per-inch (TPI). The track pitch can be changed via the servo control system. Linear bit density along the tracks, which is measured in bits-per-inch (BPI), can be set via the write channel clock.

During a factory process (e.g., certification testing) the TPI and BPI values may be set to different values for different radially-defined and/or circumferentially-defined zones of the disks, and these values may be different from device-to-device. The use of custom BPI/TPI values can account for manufacturing variables that affect read/write heads and media differently for different devices. This variation of TPI and BPI can also be used to tune the storage device for different characteristics, e.g., reliability, storage capacity, access speed, etc. The TPI and BPI may also be further adjusted (e.g., in a factory process or in the field) to increase capacity of some media cache zones in the event one of the zones becomes unusable (e.g., head depopulated) or experiences a reduction in capacity (e.g., media defects). In such a case, the areal density of the zones may be initially set to less than a maximum areal density, allowing for increasing the areal density later by modifying at least one of TPI an BPI for the zones.

Based on the knowledge of the factory-determined values of BPI and TPI, the firmware can set the number of guard-band tracks to protect against erasure of user data. The initial number of guard band tracks can be further increased to overprovision the media cache as described above. Thereafter, if the media cache zone allocation is changed as shown in FIG. 5, then additional PBAs can be allocated within blocks 500-502 to the point that the respective media cache zones still have the minimum required guard band tracks between the cache zones and user data zones, while compensating for lost/reduced capacity from block 503. A similar process may be performed for allocating additional space that is not part of the guard bands, e.g., addresses of internal tracks that were not initially mapped to logical address.

Figure 6:
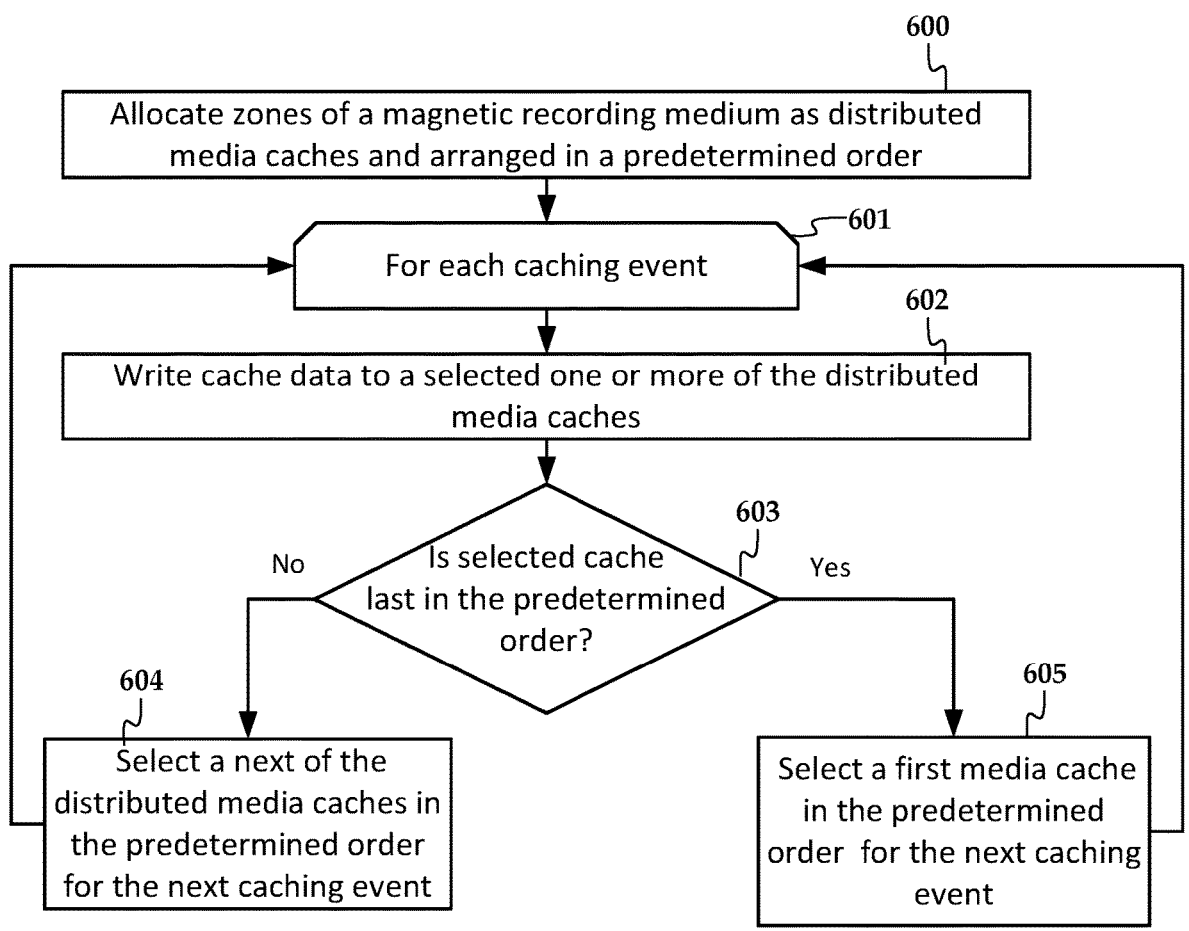
FIG. 6 is a flowchart of a method according to an example embodiment.

In FIG. 6, a flowchart shows a method according to an example embodiment. The method involves allocating 600 a plurality of zones of a magnetic recording medium as a respective plurality of distributed media caches arranged in a predetermined order. The order may be based on a sequential order of addresses of the caches, or some other order. As indicated by loop limit 601, the plurality of caching events are received. These events may be triggered by any combination of host read requests and write requests. For each event, cache data is written to a selected one or more of the distributed media caches. A determination 603 is made as to whether the selected caches is that last in the predetermined order. If not, a next of the distributed media caches is in the predetermined order is selected 604 for the next caching event. Otherwise a first media cache of the predetermined order is selected 605 for the next caching event.

It will be understood that the selection 604, 605 need not occur for every cache read or write. Generally, the caching events include cache reads and/or writes that result in the selected cache being fully utilized. Other caching events may include a cleanup operation as described above.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
defining a first set of two or more adjacent tracks and a second set of two or more adjacent tracks on a surface of a disk as media cache zones, the first and second sets located at radial locations between a middle diameter and an outer diameter of the disk that are tolerant to a high level of write activity and that minimize wear of the media cache zones due to at least one or more of head-to-disk contact and thermal degradation, the first and second sets being separated by user data zones;
allocating the media cache zones as a plurality of distributed media caches arranged in a predetermined order within the media cache zones; and
for each of a plurality of caching events:
writing cache data to a selected one or more of the distributed media caches; and
in response to the cache data being written to the selected media cache for a predetermined time period, selecting a next of the distributed media caches in the predetermined order for the next caching event.

2. The method of claim 1, wherein the caching event comprise copying data from a dynamic, random access memory to the media caches.

3. The method of claim 1, wherein the caching event comprise copying data from a user data sector to the media caches in response to a host read request.

4. The method of claim 1, further comprising:
reducing a storage capacity of one of the media cache zones; and
in response the reduction of the storage capacity, utilizing an overprovisioned storage space of others of the media cache zones to compensate for the reduction of the storage capacity.

5. The method of claim 1, wherein the next of the distributed media caches is selected in the predetermined order for the next caching event if the selected caches are not a last in the predetermined order, otherwise a first media cache being selected in the predetermined order if the selected distributed media cache is the last of the predetermined order.

6. The method of claim 5, wherein the predetermined order is a random order.

7. The method of claim 1, wherein the predetermined time is based on a write time to the selected media cache.

8. The method of claim 1, wherein the predetermined time is based on a system time that ensures no repeated access to the selected media cache for the predetermined time.

9. The method of claim 1, wherein the predetermined time is based on an amount of data written to the predetermined media cache.

10. The method of claim 1, wherein the cached data comprises one or more of cached user data, buffered commands, and system state data that is backed up in case of data loss.

11. An apparatus comprising:
interface circuitry coupled to a read/write head configured to access a surface of a disk, a first set of two or more adjacent tracks and a second set of two or more adjacent tracks on the surface of the disk being defined as media cache zones, the first and second sets located at radial locations between a middle diameter and an outer diameter of the disk that are tolerant to a high level of write activity and that minimize wear of the media cache zones due to one or more of head-to-disk contact and thermal degradation, the first and second sets being separated by user data zones, the media cache zones being allocated as a plurality of distributed media caches arranged in a predetermined order within the media cache zones;
a controller coupled to the interface circuitry and configured to perform, for each of a plurality of caching events:
writing cache data to a selected one or more of the distributed media caches; and
in response to the cache data being written to the selected media cache for a predetermined time period, selecting a next of the distributed media caches in the predetermined order for the next caching event.

12. The apparatus of claim 11, wherein the predetermined time is based on at least one of a write time to the selected media cache, a system time that ensures no repeated access to the selected media cache for the predetermined time, and an amount of data written to the predetermined media cache.

13. The apparatus of claim 11, wherein the cached data comprises one or more of cached user data, buffered commands, and system state data that is backed up in case of data loss.

14. The apparatus of claim 11, wherein the predetermined order is a random order.

15. A method comprising:
allocating a plurality of zones of a magnetic recording medium as a respective plurality of distributed media caches arranged in in a predetermined order, each of the zones comprising two more adjacent tracks at radial locations between a middle diameter and an outer diameter of the disk and being separated by user data zone, the radial locations tolerant to a high level of write activity and that minimize wear of the media cache zones due to one or more of head-to-disk contact and thermal degradation;
for each of a plurality of caching events:
writing cache data to a selected one or more of the distributed media caches; and
in response to the cache data being written to the selected media cache for a predetermined time period, selecting a next of the distributed media caches in the predetermined order for the next caching event.

16. The method of claim 15, wherein the predetermined time is based on a write time to the selected media cache.

17. The method of claim 15, wherein the predetermined time is based on a system time that ensures no repeated access to the selected media cache for the predetermined time.

18. The method of claim 15, wherein the predetermined time is based on an amount of data written to the predetermined media cache.

19. The method of claim 15, wherein the cached data comprises one or more of cached user data, buffered commands, and system state data that is backed up in case of data loss.

20. The method of claim 15, wherein the predetermined order is a random order.

* * * * *